United States Patent Office

2,890,235
Patented June 9, 1959

2,890,235

TRIFLUOROMETHYL-SUBSTITUTED TRIARYL PHOSPHATE ESTERS

Charles F. Raley, Jr., San Antonio, Tex., assignor to the United States of America as represented by the Secretary of the Air Force No Drawing. Application May 8, 1956
Serial No. 583,594

1 Claim. (Cl. 260—461)

This invention relates to a new class of phosphoric acid esters and to a method of making the same. More particularly, this invention relates to triaryl phosphates having the general formula:

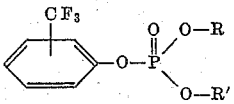

wherein R and R' represent the same or different aromatic radicals any of which including the trifluoromethyl-substituted aromatic radical may have one or more substituents that are non-reactive in the presence of phosphorus oxyhalides. Such compounds have utility as lubricants or additives therefor, hydraulic fluids, heat transfer media and in some cases as plasticizers suitable for use in the processing of plastic compositions. Some of the compounds also possess substantial fungicidal properties which enable their use as impregnating agents for the treatment of textiles, wood, leather, etc.

Alkyl, aryl and alkaryl esters of phosphoric acid are substantially nonflammable and possess many significant properties which make many of the compounds belonging to these classes desirable for various applications including, among others, most of those mentioned above. The triaryl phosphates, in particular, possess rather high boiling points and good lubricity characteristics and the possible use of certain compounds of this type as lubricants in jet engines has involved considerable interest. One reason for this has been the fact that the present requirements of lubricants in jet engines are becoming of such severity that the presently used synthetic lubricants are rapidly becoming quite unsatisfactory. In this connection, the attribute of good high temperature stability possessed by many triaryl phosphates is particularly desired especially when good low temperature fluidity is also present.

The incorporation of substituents including halogen, alkyl, alkoxy and other groups within the molecule of a triaryl phosphate such as triphenyl phosphate as well as the substitution of one or more of the phenyl groups thereof with other aromatic radicals such as biphenyl, naphthyl and the like is known, such structural modifications often providing improved activity or functional properties for a given purpose including most of the aforesaid uses for triaryl phosphates. The resulting increase in molecular weight, however, is frequently accompanied by an unwanted increase in viscosity and melting point. Accordingly, a number of the triaryl phosphates are either solids or extremely viscous liquids at ordinary temperatures and this property detracts somewhat from their utility for some applications.

In determining the suitability of various triaryl phosphates, factors other than viscosity and melting point must, of course, be considered. The principal considerations are determined on the basis of the specific intended use, but, in general, corrosiveness, compatibility with other substances, solubility, oxidative and hydrolytic stability, thermal stability and other properties are usually of significant importance.

I have now found that by introducing a trifluoromethyl group as a substituent on one or more of the aromatic radicals comprising the triaryl phosphate, said substituent being preferably in the meta position relative to the point of attachment of the ring structure to the phosphorus atom through the oxygen linkage, a pronounced volatilizing and viscosity-reducing effect is imparted to the compound. It thus becomes possible to convert many triaryl phosphates which are ordinarily solids at room temperature or thereabouts to liquids having markedly improved viscosity characteristics. In other cases, triaryl phosphates which are extremely viscous liquids at ordinary temperatures may be sufficiently improved in fluidity to permit their use in applications which were previously either impractical or objectionable on account of their viscosity. In addition to these advantages, the compounds of this invention usually retaining substantially the same desirable properties associated with the corresponding substances lacking the trifluoromethyl group are usually made more soluble particularly in hydrocarbon solvents thereby enhancing their compatibility with many materials that may be used in conjunction therewith. The use of otherwise suitable triaryl phosphates in fungus-proofing operations and as plasticizing agents is also enhanced thereby in that the tendency of the reagent to crystallize and to exude to the surface of the treated materials or to cause blooming of the plasticized compositions is substantially minimized. A further advantage derived by the incorporation of a trifluoromethyl substituent in a triaryl phosphate compound in accordance with the present invention resides in the fact that considerable improvement in oxidative resistance is apparently imparted to the compound. This property is of considerable importance particularly in connection with the use of triaryl phosphates as lubricants, additives, or as hydraulic fluid compositions since the ability of the fluid to resist oxidation or degradation is closely related to its corrosivity to metal surfaces and also to sludge formation.

It is, therefore, an object of the invention to provide a new and novel class of triaryl phosphates possessing unusual volatility and reduced viscosity properties.

It is yet another object of this invention to provide new triaryl phosphates having improved fluidity characteristics whereby the utility of the same for use as a lubricant, hydraulic fluid or as a heat transfer medium is substantially enhanced.

It is a further object of this invention to provide new compounds of the triaryl phosphate type which are useful as fungicidal agents and as plasticizers for the treatment of plastic compositions.

It is yet another object of this invention to provide new triaryl phosphate compounds possessing improved solubility in hydrocarbon solvents and further characterized by a minimized tendency toward oxidation.

It is a still further object of this invention to provide a process for synthesizing triaryl phosphates containing a trifluoromethyl substituent attached to at least one of the aromatic radicals connected to the phosphorus atom through an oxygen linkage.

These and other objects of the invention will become apparent as the application proceeds.

The herein described new triaryl phosphates having the general formula previously set forth are prepared by reacting a phosphorus oxyhalide with a phenolic compound, the latter containing at least one trifluoromethyl substituent in either the ortho, meta or para position although the meta position is preferred. If desired, the corresponding alkali metal salt thereof may be used instead of the free phenol. The phenolic reactant may contain substituents such as alkyl, halogen, alkoxy, aryl, aralkyl or alicyclic in addition to the trifluoromethyl substituent, the inclusion of other substituents being limited to those which are substantially neutral or unreactive in the presence of phosphorus oxyhalide under the reaction conditions employed. Although m-trifluoromethylphenol is preferred as the phenolic compound, the pronounced volatilizing and reduced viscosity effects as well as the other beneficial properties attributable to the trifluoromethyl radical is not limited thereto. Illustrative phenolic reactants containing the trifluoromethyl group include m-trifluoromethylphenol, o-chloro-m-trifluoromethylphenol, o-trifluoromethylphenol, p-trifluoromethylphenol, m-trifluoromethyl-p-tert. butylphenol, o-phenyl-m-trifluoromethylphenol, o-methyl - m-trifluoromethylphenol, etc.

To prepare a symmetrical triaryl phosphate of the type herein disclosed, a sufficient quantity (i.e., at least three molecular equivalents) of the trifluoromethylphenol or the alkali metal salt thereof is reacted with the phosphorus oxyhalide such as $POCl_3$ to replace all three of the halogen atoms of the phosphorus oxyhalide with the aromatic radicals containing the trifluoromethyl substituent.

When a mixed triaryl phosphate is desired, the same may be prepared by reacting one or two molecular equivalents of the trifluoromethyl phenol or the alkali metal salt thereof and then reacting the resulting mono- or disubstituted phosphorus oxyhalide with an appropriate quantity of another phenolic compound or its alkali metal salt. In order to provide three different aromatic radicals, successive additions of the three corresponding phenolic compounds or their alkali metal salts are necessary and the order in which the different phenolic compounds are reacted is not generally important.

Each of the reactions mentioned above is carried out by heating a mixture of the reactants to a reaction temperature, preferably in the presence of a catalyst such as metallic calcium, magnesium or aluminum or a chloride of magnesium, aluminum, iron, etc. The temperature to which the mixture must be heated in order to obtain rapid reaction is dependent upon the specific reactants employed, the relative proportions of the reactants and the presence or absence of catalysts, reaction solvents, etc. Since the reaction is accompanied by an evolution of hydrogen halide when the phenolic compounds are employed, it is necessary merely to heat the mixture to a temperature at which hydrogen halide gas is evolved. The reactions are carried out preferably at about 200° C. or below to minimize by-product formation.

In preparing a mixed triaryl phosphate of the type herein designated from a phosphorus oxyhalide and the desired phenolic compounds, the intermediate aryl phosphoric acid halide products may be isolated if desired by fractional distillation or other suitable means prior to carrying out the successive reactions. In general, however, after formation of such intermediate has been completed, it is merely necessary to add the desired quantity of a second phenol, naphthol, cresol, chlorophenol, etc. and to continue the reaction in this manner until the synthesis of the triaryl phosphate is completed. In this manner, the extra steps involved in separating the intermediate acid halide are avoided. After the reactions for the formation of the triaryl phosphate are completed, the reaction mixture is treated to remove hydrogen halide and other volatile impurities and then distilled to separate the triaryl phosphate product.

The phenolic reactancts other than the trifluoromethyl substituted phenol suitable for preparing the triaryl phosphates of this invention may similarly contain substituents which are substantially unreactive with the phosphorus oxyhalide under the reaction conditions employed in the synthesis. These include phenols or the alkali metal salts having one or more alkyl, halogen, alkoxy, aryl, aralkyl or alicyclic substituents. Illustrative phenolic compounds are phenol, cresol, chlorophenol, naphthol, cyclohexylphenol, phenylphenol, tert. butylphenol, methyl tert. butylphenol, methoxyphenol etc.

Illustrative triaryl phosphates of this invention wherein one or more of the aromatic radicals contain the aforesaid trifluoromethyl substituent include the following compounds but are not limited thereto:

Tris (m-trifluoromethylphenyl) phosphate
Phenyl bis (m-trifluoromethylphenyl) phosphate
Diphenyl m-trifluoromethylphenyl phosphate
Bis (o-chlorophenyl) m-trifluoromethylphenyl phosphate
Tris (p-trifluoromethylphenyl) phosphate
Bis (m-trifluoromethylphenyl) 4-biphenylyl phosphate
Diphenyl o-trifluoromethylphenyl phosphate
Phenyl m-trifluoromethylphenyl 1-naphthyl phosphate
Phenyl m-trifluoromethylphenyl 2-naphthyl phosphate
o-Chlorophenyl m-trifluoromethylphenyl 1-naphthyl phosphate
Phenyl m-trifluoromethylphenyl 4-biphenylyl phosphate
Phenyl m-trifluoromethylphenyl p-tert. butyl phenyl phosphate
Bis (m-cresyl) m-trifluoromethylphenyl phosphate
Phenyl p-methoxyphenyl m-trifluoromethylphenyl phosphate
Bis (p-chlorophenyl) m-trifluoromethylphenyl phosphate
Bis (1-naphthyl) m-trifluoromethylphenyl phosphate
Bis (o-chlorophenyl) 3-trifluoromethyl-4-tert. butylphenyl phosphate
Bis (4-biphenylyl) m-trifluoromethylphenyl phosphate
Bis (2-biphenylyl) m-trifluoromethylphenyl phosphate It will be seen from the foregoing that the triaryl phosphates of this invention may be varied extensively insofar as the structure of specific aromatic radicals is concerned. Although the trifluoromethyl substituent may be attached to one or more of the aromatic radicals in either ortho, meta or para position and the same may be present in conjunction with other neutral substituents, preferred embodiments comprise the class of compounds wherein an m-trifluoromethyiphenyl radical constitutes one of the aromatic radicals of the triaryl phosphate.

The invention is further illustrated in the following examples, but is not to be construed as limited to details described therein.

Example 1

*Tris (m-trifluoromethylphenyl) phosphate.*—A mixture of 133.5 g. (0.825 mol) of m-trifluoromethylphenol, 42.2 g. (0.275 mol) of $POCl_3$ and 4.4 g. of anhydrous $MgCl_2$ was heated to 200° C. and maintained at that temperature for four hours to permit the reaction to proceed to substantial completion. The mixture was stripped at 150° C. under aspirator vacuum, then fractionally distilled in vacuo. A yield of 103 g. amounting to 71% of the theoretical amount of tris (m-trifluoromethylphenyl) phosphate was obtained, the product being a thin yellow liquid, B.P. 151–154° C./0.15 mm.; M.P. 13° C.; $n_D^{26}$ 1.6790; $d_4^{25}$ 1.4576; and molecular weight 530 (calc.) and 529 (obsd.).

This phosphate with a molecular weight of 530 possessed surprising volatility as shown by a boiling point of 366° C. By way of comparison, tris (o-chlorophenyl) phosphate having a molecular weight of 430 boils at 463° C. and triphenyl phosphate with a molecular weight of 326 boils at 385° C. The compound is thermally stable above its boiling point and has a pour point of −35° F. Other properties thereof include a flash point of 430° F.; fire point 670° F.; autogenous ignition temperature >1400° F.; and hydrolytic stability in contact with water at 100° F. for 16 hours expressed as mg. KOH/g. of compound, 2.31.

Example 2

*Phenyl m-trifluoromethylphenyl 1-naphthyl phos-* phate.—To 44.5 g. (0.275 mol) of m-trifluoromethylphenol in 340 g. of pyridine was added 87.5 g. (0.275 mol) of phenyl 1-naphthyl phosphoryl chloride, the latter being prepared by successively reacting $POCl_3$ with molecular equivalent amounts of 1-naphthol and phenol respectively. The mixture was heated to reflux, allowed to cool and stored under refrigeration for 15 hours. The pyridine hydrochloride was separated by filtration and the filtrate was stripped of volatiles first under atmospheric pressure and then under aspirator vacuum. The product, namely, phenyl m-trifluoromethylphenyl 1-naphthyl phosphate isolated by fractional distillation in vacuo amounting to 77.1 g. or a yield of 63% was a pale yellow oil, B.P. 198–205° C./0.25 mm., $n_D^{25}$ 1.5642; $d_4^{25}$ 1.3215; and molecular weight 444 (calc.) and 437 (obsd.).

Compared to a rather closely related compound, namely, phenyl o-chlorophenyl 1-naphthyl phosphate which is a viscous liquor with a normal boiling point of 473° C. and a pour point of 15° F., the volatilizing influence of the trifluoromethyl substituent in the molecule is further demonstrated by a decrease of 52° C. in the normal boiling point and 10° F. in the pour point despite an increase of 33 units in molecular weight. Other properties of the compound include a flash point of 485° F.; fire point >760° F.; autogenous ignition temp. >1400° F.; and hydrolytic stability in contact with water at 100° F. for 16 hours expressed as mg. KOH/g. of compound, 2.73.

Example 3

Bis (m-trifluoromethylphenyl) 4-biphenylyl phosphate.—To 71.8 g. (0.25 mol) of 4-biphenylyl phosphoryl dichloride dissolved in 227 g. of pyridine was added 81 g. (0.5 mol) of m-trifluorophenol. The mixture became quite warm and was further heated to reflux temperature and then left standing for 15 hours. The mixture was filtered and distilled at atmospheric pressure to 150° C. (flask temp.) followed by heating to 150° C. under aspirator vacuum. Subsequent distillation in vacuo gave 70.4 g. (52.3% yield) of bis (m-trifluoromethylphenyl) 4-biphenylyl phosphate, a yellow liquid having a B.P 230–231° C./0.18 mm.; $n_D^{31}$ 1.5349; $d_4^{25}$ 1.3684; and molecular weight 538 (calcd.) and 537 (obsd.)

This compound again exhibited the pronounced effect of the trifluoromethyl substituent in enhancing volatility compared to bis (o-chlorophenyl) 4-biphenylyl phosphate, the boiling point was 85° C. lower notwithstanding the fact that the molecular weight was 64 units higher. The compound was reasonably fluid having a viscosity of 82 cs. at 100° F. and was stable above its normal boiling point, 424° C.

Diphenyl 4-biphenylyl phosphate, a related compound differing only by the absence of two trifluoromethyl substituents possesses high thermal stability (above 485° C.) but is a solid having a melting point of 65° C. The presence of a trifluoromethyl substituent in each of the two phenyl radicals of the molecule makes it possible to retain the high thermal stability while achieving a liquid state.

Other properties of the compound include a flash point of 520° F.; fire point 710° F.; autogenous ignition temp. >1400° F.; and hydrolytic stability in contact with water at 100° F. for 16 hours expressed as mg. KOH/g. of compound, 0.92.

Increased solubility of the trifluoromethyl-substituted triaryl phosphates in aliphatic naphtha is also obtained as evidenced by infinite solubility of the compounds in the illustrative examples whereas related compounds lacking the trifluoromethyl substituents possess rather limited solubilities in the same solvent.

It will be seen from the foregoing that substantial changes in volatility and fluidity as well other important properties may be readily achieved by modifying the molecular structure of the triaryl phosphate with the introduction of at least one trifluoromethyl substituent on one or more of the aromatic radicals thereof. In this manner, many triaryl phosphates heretofore impractical for use in connection with any of the previously stated uses may, in their modified form, be utilized satisfactorily with full advantage being taken of the desirable high temperature stability, nonflammability and suitable attributes thereof.

It is apparent from the foregoing that many widely differing embodiments of this invention may be made without departing from the spirit and scope thereof and it is not intended to be limited except as indicated in the appended claim.

I claim:

Phenyl m-trifluoromethylphenyl 1-naphthyl phosphate.

References Cited in the file of this patent

UNITED STATES PATENTS

| | | |
|---|---|---|
| 2,033,916 | Bass | Mar. 17, 1936 |
| 2,694,083 | Moreton et al. | Nov. 9, 1954 |

OTHER REFERENCES

Kosolapoff: Organophosphorus Compounds, p. 211, John Wiley & Sons, New York, N.Y. (1950).